US006744710B2

(12) United States Patent
Fu

(10) Patent No.: US 6,744,710 B2
(45) Date of Patent: Jun. 1, 2004

(54) IDENTIFICATION METHOD FOR LEVEL AND UPRIGHT ASSEMBLING OF OPTICAL DISK DRIVER

(75) Inventor: Hsiang-Yi Fu, Taipei (TW)

(73) Assignee: Lite-On It Corporation, Taipei (TW)

( * ) Notice: Subject to any disclaimer, the term of this patent is extended or adjusted under 35 U.S.C. 154(b) by 610 days.

(21) Appl. No.: 09/838,237

(22) Filed: Apr. 20, 2001

(65) Prior Publication Data

US 2002/0154581 A1 Oct. 24, 2002

(51) Int. Cl.⁷ .................................................. G11B 7/00
(52) U.S. Cl. ..................................................... 369/44.27
(58) Field of Search ........................... 369/44.11, 44.14, 369/44.15, 44.27, 53.1, 53.2, 44.26

(56) References Cited

U.S. PATENT DOCUMENTS 6,603,720 B1 * 8/2003 Kuroda et al. ........... 369/53.23

* cited by examiner

Primary Examiner—Nabil Hindi
(74) Attorney, Agent, or Firm—Rosenberg, Klein & Lee

(57) ABSTRACT

An identification method for level and upright assembling of optical disk driver is proposed. The laser lens of optical disk driver has different displacement for different arrangement of the optical disk driver. The added signal Sub-beam add takes different time to reach peak value for different arrangement of the optical disk driver. The assembling orientation of the optical disk driver can be discriminated and the auto balance system will have better performance. The speed profile can be correctly designed; and the vibration and the noise of the optical disk driver due to imbalance in high-speed rotation can be prevented.

1 Claim, 4 Drawing Sheets

IDENTIFICATION METHOD FOR LEVEL AND UPRIGHT ASSEMBLING OF OPTICAL DISK DRIVER

FIELD OF THE INVENTION

The present invention relates to an identification method for level and upright assembling of optical disk driver, especially to an identification method using a laser lens to discriminate level and upright assembling of optical disk driver.

BACKGROUND OF THE INVENTION

The optical disk driver has fast development as the demanding of optical storage medium is urgent. To date the accessing speed of CD-ROM driver is increased to 48× and the accessing speed of CD-R/RW, DVD-ROM driver is also fast enhanced.

However, the problem to reduce shock and vibration becomes serious as the accessing speed of optical disk driver is greatly increased. To overcome this problem, an auto balance system (ABS) for reducing shock is developed, wherein the rotating body is rotated at a critical frequency F0 to stay at optimal balance position. The shock and vibration of the rotating body can be reduced even at high-speed rotation.

The optical disk driver can be operated at level or upright position. However, the critical frequency F0 is different for optical disk driver operated at level or upright position. Therefore, it is desirable to identify the level and upright assembling of optical disk driver to ensure the effect of the auto balance system.

SUMMARY OF THE INVENTION

It is the object of the present invention to provide an identification method for level and upright assembling of optical disk driver, which uses a firmware to identify the level and upright assembling of optical disk driver to ensure the effect of the auto balance system.

To achieve above object, the present invention provides an identification method for level and upright assembling of optical disk driver. A laser light is impinged onto the optical disk, and an optical detector senses the reflected light from the optical disk and generating two signal Sub-beam (E, F). The added signal Sub-beam add (E+F) has peak value when a focusing coil is passed the focus point. When the optical disk driver is arranged in level position, the distance between the focus point and center of laser lens is D1; when the optical disk driver is arranged in upright position, the distance between the focus point and center of laser lens is D2, wherein D1>D2. The laser lens of the optical disk driver in level arrangement travels a longer distance to reach the focal point; while the laser lens of the optical disk driver in upright arrangement travels a shorter distance to reach the focal point. Therefore, the laser lens of the optical disk driver in level arrangement takes extra time to reach the focal point. By the time difference, the assembling orientation of the optical disk driver can be discriminated.

The various objects and advantages of the present invention will be more readily understood from the following detailed description when read in conjunction with the appended drawing, in which:

DETAILED DESCRIPTION OF THE INVENTION

Figure 1:
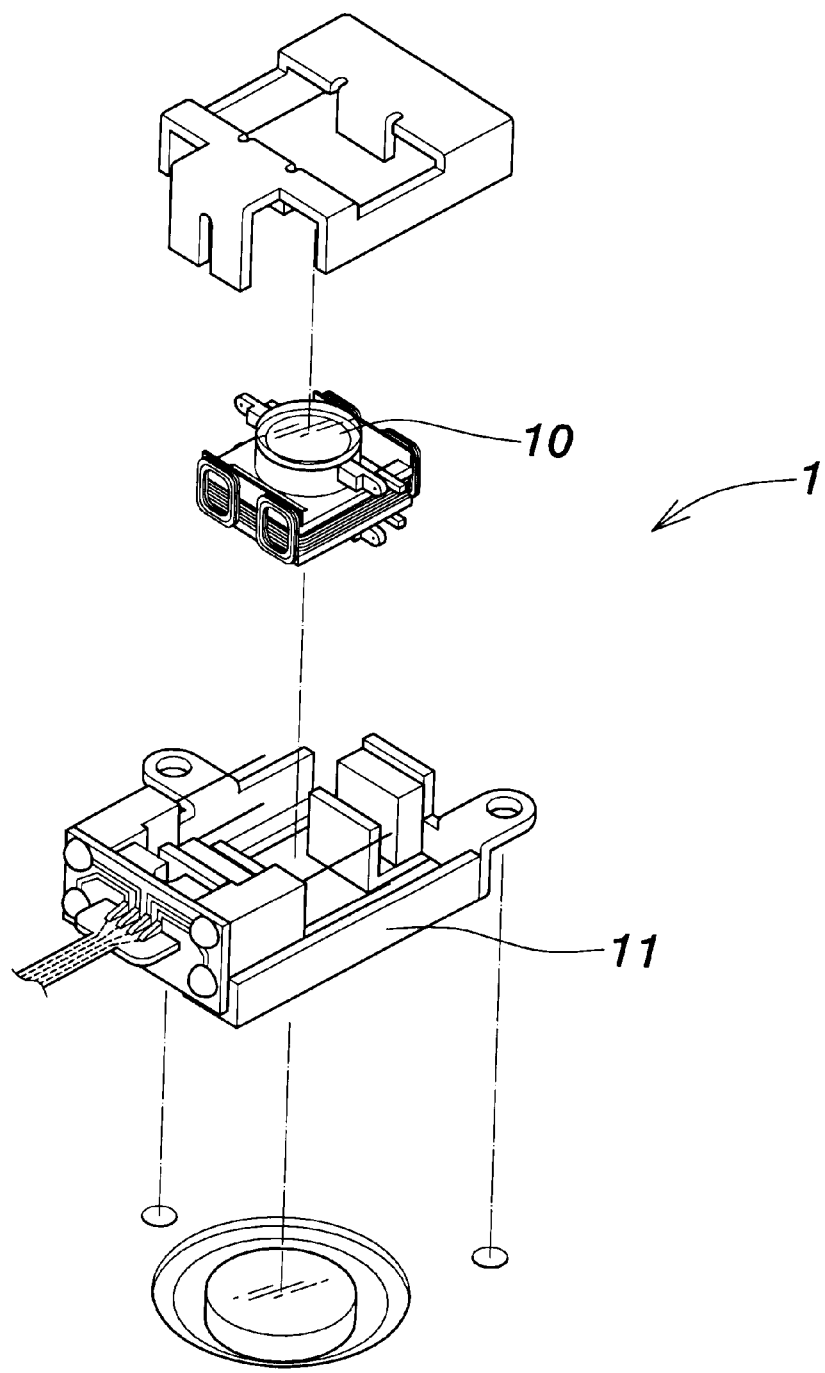
FIG. 1 shows the exploded view of a pick-up head in the present invention.
Figure 2:
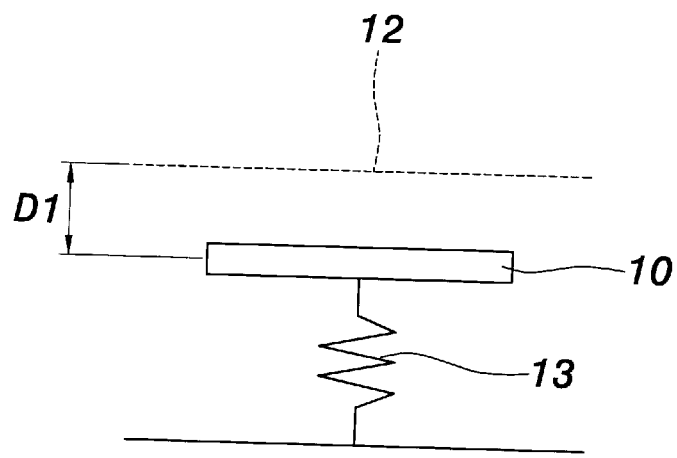
FIG. 2 is a sectional view of an optical disk driver in level arrangement.
Figure 3:
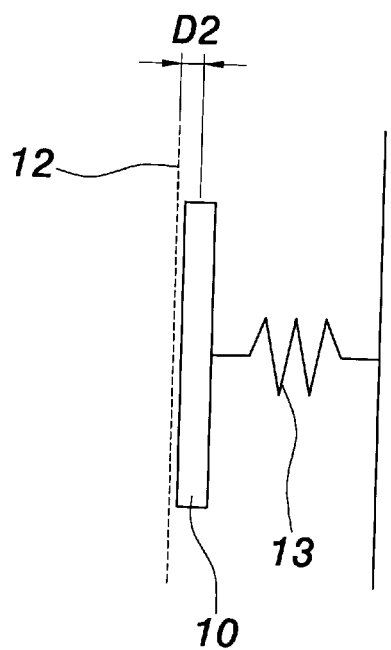
FIG. 3 is a sectional view of an optical disk driver in upright arrangement.
Figure 4:
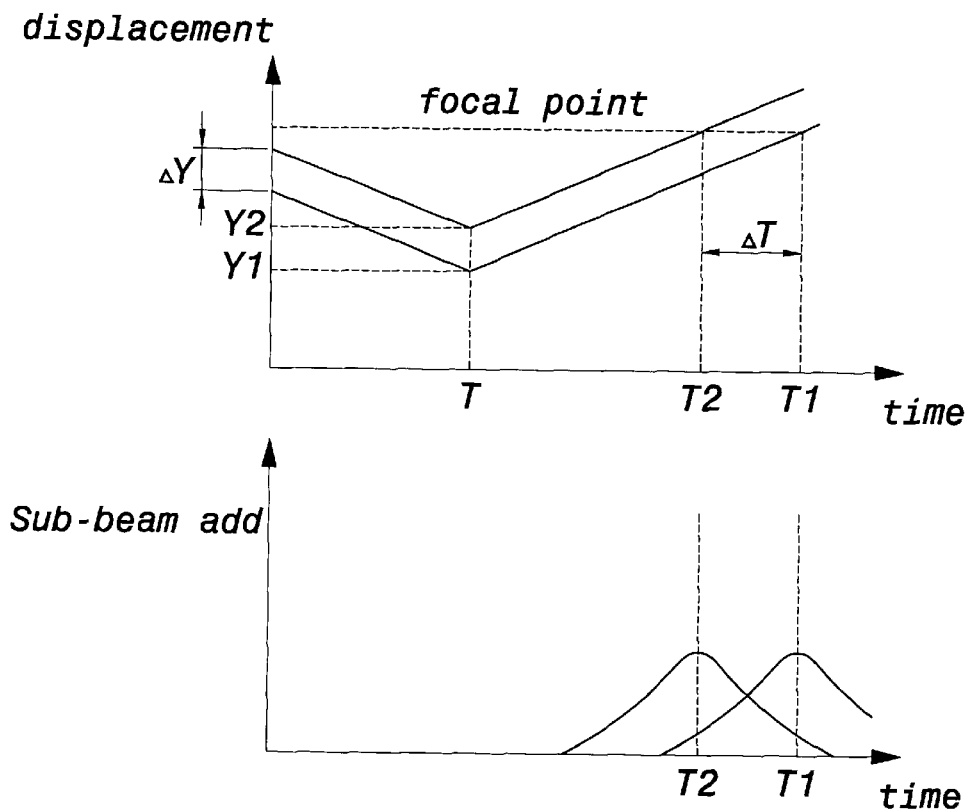
FIG. 4 shows the relationship of displacement of focusing coil applied by voltage with respect to time, and relationship of Sub-beam add with respect to time.
Figure 5:
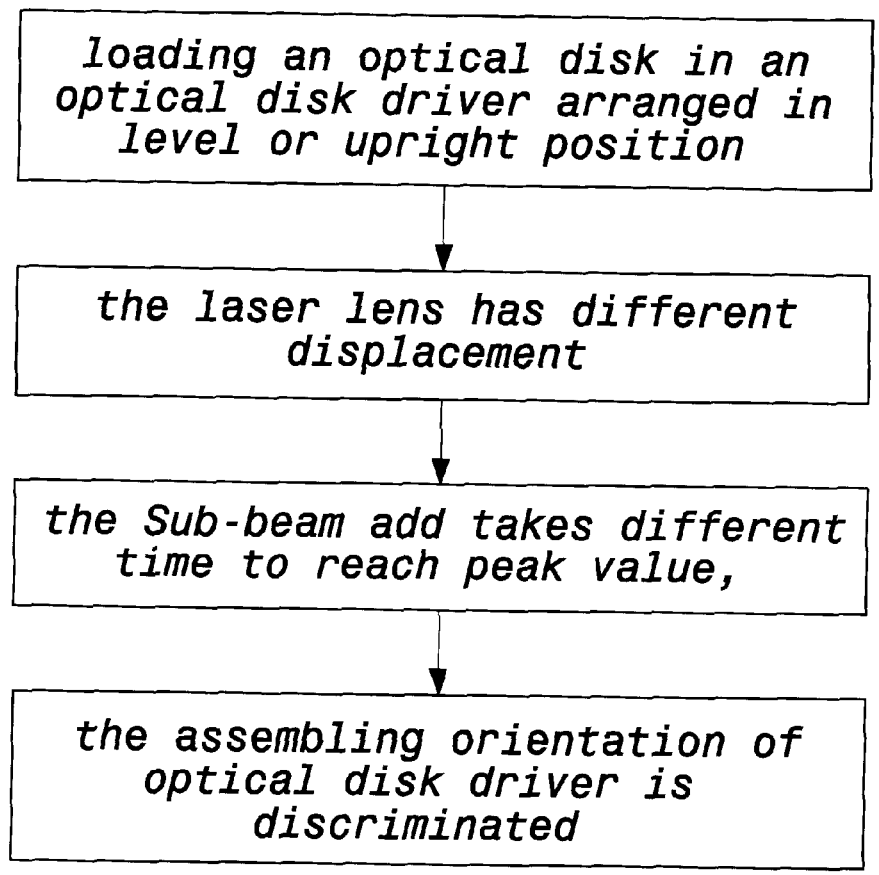
FIG. 5 shows the flowchart of the method of the present invention.

The present invention is intended to provide an identification method for level and upright assembling of optical disk driver, which is employed for a pick-up head of the optical disk driver. As shown in FIG. 1, the pick-up head 1 of the optical disk driver mainly comprises optical system composed of a laser light source, a laser lens 10, a reflection mirror and an optical detector; and a supporting mechanism 11 to move the laser lens 10 for tracking and focusing; and an electromagnet driving system for driving above units. The optical system can detect the data signal stored in the optical disk as well as the error signal for controlling focusing and tracking. By the detection function of the optical system, the present invention can identify the level and upright assembling of optical disk driver. The method according to the present invention comprises following steps:

(1) loading an optical disk in an optical disk driver arranged in level or upright position, the optical disk driver then judging the presence and type of the loaded optical disk;

(2) impinging a laser light onto the optical disk, and the optical detector sensing the reflected light from the optical disk and generating two signal Sub-beam (E, F);

(3) when the optical disk driver is arranged in level position, the distance between the focus point 12 and center of laser lens 10 is D1 as shown in FIG. 2;

(4) when the optical disk driver is arranged in upright position, the distance between the focus point 12 and center of laser lens 10 is D2 as shown in FIG. 3;

(5) applying an electrical voltage with negative slope to move down the focusing coil 13 with a time period T as shown in FIG. 4;

(6) applying an electrical voltage with positive slope to move up the focusing coil 13;

(7) the added signal Sub-beam add (E+F) has peak value when the focusing coil 13 is passed the focus point 12;

(8) when the optical disk driver is arranged in level position, the Sub-beam add takes time T1 to reach peak value, as shown in FIG. 4;

(9) when the optical disk driver is arranged in upright position, the Sub-beam add takes time T2 to reach peak value, as shown in FIG. 4;

(10) the laser lens has different separation (D1>D2) for optical disk driver with different assembling orientation such that the Sub-beam add takes different time (T1>T2) to reach peak value, thus discriminating the assembling orientation of optical disk driver.

FIG. 4 shows the relationship of displacement of focusing coil applied by voltage with respect to time, and relationship of Sub-beam add with respect to time. When the optical disk driver is assembled in level position, the laser lens has downward displacement ΔY due to gravity. When the optical disk driver is assembled in upright position, the focusing coil has no downward displacement. When a voltage with negative slope is applied for a time period T, the laser lens of the optical disk driver in level arrangement has total downward displacement Y1, and the laser lens of the optical disk driver in upright arrangement has total downward displacement Y2, wherein Y1=Y2+ΔY as long as the focusing coil satisfies Hook's law. When a voltage with positive slope is applied, the laser lens is moved upward. After time T2, the laser lens of the optical disk driver in upright arrangement reaches the focal point; and after time T1, the laser lens of the optical disk driver in level arrangement reaches the focal point. The laser lens of the optical disk driver in level arrangement travels a longer distance Y1 to reach the focal point; while the laser lens of the optical disk driver in upright arrangement travels a shorter distance Y2 to reach the focal point. Therefore, the laser lens of the optical disk driver in level arrangement takes extra time ΔT to reach the focal point. By the time difference, the assembling orientation of the optical disk driver can be discriminated.

To sum up, by the method of the present invention, the assembling orientation of the optical disk driver can be discriminated and the auto balance system will have better performance. The speed profile can be correctly designed; and the vibration and the noise of the optical disk driver due to imbalance in high-speed rotation can be prevented.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An identification method for level and upright assembling of optical disk driver, comprising following steps:

(1) loading an optical disk in an optical disk driver with a laser lens and a focusing coil, and arranged in level or upright position;

(2) impinging a laser light onto the optical disk, and an optical detector sensing a reflected light from the optical disk and generating a signal;

(3) the laser lens of optical disk driver having different displacement for different arrangement of the optical disk driver;

(4) applying an electrical voltage with negative slope to move down the focusing coil with a time period;

(5) applying an electrical voltage with positive slope to move up the focusing coil (6) the added signal has peak value when the focusing coil is passed the focus point; and (7) the added signal takes different time to reach peak value for different arrangement of the optical disk driver whereby the assembling orientation of the optical disk driver can be discriminated and an auto balance system will have better performance; the speed profile can be correctly designed; and the vibration and the noise of the optical disk driver due to imbalance in high-speed rotation can be prevented.

* * * * *